Patented Nov. 6, 1951

2,573,702

UNITED STATES PATENT OFFICE 2,573,702

ALUMINA CHROMATOGRAPHIC PURIFICATION OF LIVER EXTRACTS

Karl Folkers, Plainfield, N. J., and John Shavel, Jr., Evanston, Ill., assignors to Merck & Co., Inc., Rahway, N. J., a corporation of New Jersey No Drawing. Application April 9, 1948, Serial No. 20,106

3 Claims. (Cl. 167—74.6)

This invention relates generally to the preparation of therapeutic materials and, more particularly, to the purification of anti-pernicious anemia concentrates from crude commercial liver preparations.

It is well known that liver contains an anti-pernicious anemia factor. This factor, however, is present in very small amounts and it is usually contaminated with impurities of varied nature. It has been proposed to isolate the anti-pernicious anemia factor from commercial liver concentrates in order to obtain a product of high potency and free from undesirable contaminating impurities. It had been supposed previously that the active material is proteinaceous or polypeptide in nature. Proteinaceous compounds do not lend themselves to certain methods of purification such as chromatographic adsorption. The separation of mixtures of proteinaceous compounds by adsorption methods is very difficult since proteins adsorbed on columns often spread out into diffuse bands that separate slowly and incompletely from one another. ("Chromatographic Adsorption Analysis" p. 114, Interscience Publishers, 1942, New York.)

We have now found that we can purify the anti-anemia factor in crude commercial liver concentrates by a chromatographic technique. The purification is carried out under closely controlled conditions, whereby the possibility of destruction or loss of the activity of the material is reduced to a minimum.

The chromatographic purification of commercial liver concentrates, when carried out in accordance with the invention herein disclosed, results in the preparation of the anti-pernicious anemia factor in a purified form. The material is completely water soluble, free from colored or water insoluble impurities and possesses high physiological activity, particularly suitable for the clinical treatment of pernicious anemia.

In carrying out our invention in a preferred manner a crude commercial liver extract or concentrate is first dissolved in water. This water extract is passed through a chromatographic column prepared by pouring a slurry of alumina in water into a glass tube and washing the adsorbent with dilute acid and water. The column is then developed with water and the eluates collected. The purified anti-pernicious anemia material can then be isolated from these eluates by concentrating the solution to dryness, dissolving the residue in water and precipitating with a 2:1 mixture of ethanol-ethyl ether. The formed white precipitate is then dried and was found to possess a specific rotation of $[\alpha]_D^{25} -138°$. If desired, the first eluate may be frozen in a Dry-Ice bath and concentrated to dryness in the frozen state in vacuo. A white residue is obtained having a specific rotation of $[\alpha]_D^{25} -131°$.

The following examples illustrate a method of carrying out the present invention, but it is to be understood that these examples are given by way of illustration and not of limitation.

Example 1

An alumina column was prepared by pouring a slurry of alumina in water into a glass tube 1.8 x 25 cm. in size. The adsorbent had been washed previously by dilute sulfuric acid followed by distilled water until the washings showed a pH of 6.5–7.0. The column was then washed with water to free it of fine particles of alumina. The column was now 1.8 x 14 cm. in size. A quantity of 1.35 g. of "Anahaemin," a crude liver concentrate available commercially and comprising a 70% ethanol soluble fraction of an aqueous liver extract, was dissolved in 10 ml. of water and this solution was passed through the column. A light brown colored area appeared at the top of the column and descended 2 cm. in depth. The lower portion of the column was tan colored, decreasing in intensity near the bottom. The column showed no fluorescence when observed under ultra-violet light.

The column was now developed with water and the eluates were collected in 25-ml. portions. The first eluate, on concentration to dryness in vacuo, yielded 123 mg. of brown residue, while the second eluate yielded 401.8 mg. of a straw-colored residue. The third eluate had only a trace of material in it. The second residue showed a specific rotation of $[\alpha]_D^{25} -138°$. This second residue was dissolved in 3 ml. of water, and precipitation was caused by the addition of 200 ml. of 2:1 mixture of ethanol-ethyl ether. After drying the white precipitate at 25° in vacuo for 8 hours, it amounted to 172 mg. and possessed a specific rotation of $[\alpha]_D^{25} -138°$. After drying in vacuo at 60° for one hour, it lost 7.6% in weight and showed 16.06% N.

Example 2

A quantity of 1.30 g. of the crude commercial liver concentrate described in Example 1 was dissolved in 10 ml. of water and this solution was chromatographed over a column of alumina (2 x 10 cm.) prepared as described in Example 1. The column was developed with water, as before, and the first 50 ml. of eluate collected was immediately frozen in a Dry-Ice bath, then concentrated to dryness in the frozen state in vacuo. This procedure yielded 362 mg. of a white residue which had a specific rotation of $[\alpha]_D^{25} -131°$.

After a sample was dried to constant weight at 60° in vacuo, the loss in weight was 9% and the sample showed $[\alpha]_D^{25} -134°$ and 17.6% N. The original commercial liver concentrate showed $[\alpha]_D^{25} -111°$.

When 30-35 mg. of this white solid was given to a pernicious anemia patient, a strongly positive response was obtained in one week. The blood count rose from 1.6 to 2.0 million/cc. and the reticulocytes rose from 2% to 25%.

Modifications may be made in carrying out the present invention without departing from the spirit and scope thereof, and the invention is to be limited only by the appended claims.

We claim:

1. The process for the purification and concentration of the anti-pernicious anemia factor in liver, which comprises passing an aqueous solution of a liver concentrate through a chromatographic column containing activated alumina, developing and eluting said column with water, concentrating the eluates to dryness, dissolving the residue in water and precipitating the active substance with an ethanol-ethyl ether mixture.

2. The process for the purification and concentration of the antipernicious anemia factor in liver, which comprises passing an aqueous solution of a liver concentrate through a chromatographic column containing activated alumina, eluting the active substance with water and removing the water from the resulting eluate.

3. In the process for the purification and concentration of the antipernicious anemia factor in liver, the steps which comprise passing an aqueous solution of a liver concentrate through a chromatographic column containing activated alumina, and eluting the active substances with water.

KARL FOLKERS.
JOHN SHAVEL, Jr.

REFERENCES CITED

The following references are of record in the file of this patent:

UNITED STATES PATENTS

| Number | Name | Date |
| --- | --- | --- |
| 1,813,788 | Walden | July 7, 1931 |
| 2,134,256 | Laland | Oct. 25, 1938 |

FOREIGN PATENTS

| Number | Country | Date |
| --- | --- | --- |
| 590,956 | Great Britain | Aug. 1, 1947 |
| 473,064 | Great Britain | Oct. 5, 1937 |

OTHER REFERENCES

Castle in Am. J. Pharm., Feb. 1936, on Treatment of Pernicious Anemia, pages 55 to 61. (Copy in Patent Office Library.)

Stanger in J. A. C. S., Oct. 1944, on Unsaponifiable Residues of Human Liver, pages 1621-1623. (Copy in Patent Office Library.)

Zechmeister, "Principles and Practice of Chromatography," N. Y., 1941, pages 51, 139, 140, 244. (Copy in Division 43.)

Williams, "An Introduction to Chromatography," 1946, pages 4, 5, 18 to 21. (Copy in Division 43.)